US012657672B2

(12) United States Patent
Kwak et al.

(10) Patent No.: US 12,657,672 B2
(45) Date of Patent: Jun. 16, 2026

(54) IMAGE DENOISING METHOD

(71) Applicant: SAMSUNG ELECTRONICS CO., LTD., Suwon-si (KR)

(72) Inventors: Nohong Kwak, Suwon-si (KR); Donyun Kim, Suwon-si (KR); Jiwon Kang, Suwon-si (KR); Kihyun Kim, Suwon-si (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 282 days.

(21) Appl. No.: 18/612,094

(22) Filed: Mar. 21, 2024

(65) Prior Publication Data

US 2024/0320805 A1 Sep. 26, 2024

(30) Foreign Application Priority Data

Mar. 23, 2023 (KR) ........................ 10-2023-0038116

(51) Int. Cl.

*G06K 9/00* (2022.01)
*G06T 5/70* (2024.01)
*G06T 7/00* (2017.01)
*G06V 10/44* (2022.01)

(52) U.S. Cl.

CPC .............. *G06T 5/70* (2024.01); *G06T 7/0004* (2013.01); *G06V 10/44* (2022.01); *G06T 2207/20081* (2013.01); *G06T 2207/30148* (2013.01)

(58) Field of Classification Search

CPC ..................... G06T 5/70; G06T 7/0004; G06T 2207/20081; G06T 2207/30148; G06T 5/60; G06T 2207/10061; G06T 11/00; G06T 2207/20182; G06V 10/44

See application file for complete search history.

(56) References Cited

U.S. PATENT DOCUMENTS 9,342,870 B2 * 5/2016 Lin ........................... G06T 5/70
10,043,243 B2 * 8/2018 Matviychuk ...... G06F 18/21342
10,685,429 B2 6/2020 Mentl et al.

(Continued)

FOREIGN PATENT DOCUMENTS

WO WO 2022/263328 12/2022

OTHER PUBLICATIONS

IDR: Self-Supervised Image Denoising via Iterative Data Refinement (Year: 2022).*

(Continued)

*Primary Examiner* — Shervin K Nakhjavan
(74) *Attorney, Agent, or Firm* — Fish & Richardson P.C.

(57) ABSTRACT

There is provided an image denoising method including extracting a noise patch from a noisy image, outputting a noise parameter by inputting the noise patch to a noise parameter estimation network (NPE-net), generating imitated virtual noise based on the output noise parameter, generating a noisier image by adding the imitated virtual noise to the noisy image, training a denoise deep learning model by inputting the noisy image and the noisier image as a pair to the denoise deep learning model, inputting the noisy image to the trained denoise deep learning model, and outputting a denoise image obtained by removing noise from the noisy image by the trained denoise deep learning model.

20 Claims, 13 Drawing Sheets

(56) References Cited

U.S. PATENT DOCUMENTS

| | | | | |
|---|---|---|---|---|
| 10,789,703 | B2 | 9/2020 | Lu et al. | |
| 10,796,414 | B2 | 10/2020 | Vogels et al. | |
| 10,949,951 | B2 * | 3/2021 | Tang | G06T 5/70 |
| 11,222,415 | B2 * | 1/2022 | Ozcan | G06T 3/4046 |
| 11,232,550 | B2 | 1/2022 | Ben Baruch et al. | |
| 11,790,492 | B1 * | 10/2023 | Ahmad | G06N 3/0495 |
| 12,243,193 | B2 * | 3/2025 | Dey | G06T 5/50 |
| 12,272,030 | B2 * | 4/2025 | DeLaRosa | G06T 7/0012 |
| 12,333,689 | B1 * | 6/2025 | Gangeh | G06T 5/70 |
| 12,505,516 | B2 * | 12/2025 | Van Aert | G06T 5/70 |
| 12,511,773 | B2 * | 12/2025 | Fenger | G06T 5/70 |
| 12,518,355 | B2 * | 1/2026 | Serra Lleti | G06T 5/70 |
| 12,530,745 | B2 * | 1/2026 | Langoju | G06T 5/70 |
| 2020/0286214 | A1 * | 9/2020 | Kaneko | G06T 5/20 |
| 2021/0125001 | A1 | 4/2021 | Guo et al. | |
| 2021/0290191 | A1 | 9/2021 | Qi et al. | |
| 2022/0107378 | A1 | 4/2022 | Dey et al. | |
| 2022/0172066 | A1 * | 6/2022 | Unterthiner | G06V 10/771 |
| 2022/0301113 | A1 | 9/2022 | Delarosa et al. | |
| 2023/0013887 | A1 * | 1/2023 | Ito | G06T 7/0006 |
| 2023/0230208 | A1 * | 7/2023 | Lei | G06T 5/70<br>382/155 |
| 2023/0260100 | A1 * | 8/2023 | Zhang | G06N 3/0464<br>382/103 |
| 2024/0303783 | A1 * | 9/2024 | Aakerberg | G06T 3/4053 |

OTHER PUBLICATIONS

Giannatou et al., "Deep Learning Denoising of SEM Images Towards Noise-Reduced LER Measurements," Microelectronic Engineering, Aug. 2019, 216(111051):1-8.

Moran et al., "Noisier2Noise: Learning to Denoise from Unpaired Noisy Data," CoRR, Submitted on Oct. 25, 2019, arXiv: 1910. 11908, 8 pages.

* cited by examiner

FIG. 7

INPUT
Y
NI
DDLM
DENOISE DL MODEL
ECI
OUTPUT
ESTIMATED X

NRI
Z
NRI
Z
NI
Y
×2
ECI
OUTPUT
ESTIMATED X
NI
Y
×2
NRI
Z
ECI
ESTIMATED X

IMAGE DENOISING METHOD

CROSS-REFERENCE TO RELATED APPLICATION

This application is based on and claims priority under 35 U.S.C. § 119 to Korean Patent Application No. 10-2023-0038116, filed on Mar. 23, 2023, in the Korean Intellectual Property Office, the disclosure of which is incorporated by reference herein in its entirety.

BACKGROUND

The inventive concept relates to an image denoising method. More particularly, the inventive concept relates to a scanning electron microscope (SEM) image denoising method.

In denoising an image, a deep learning model is trained with training data with a correct image as output and an image containing noise as input, and the noise of the image containing noise is removed through the trained deep learning model. In the case of such a denoising model, a correct image without noise is required.

SUMMARY

The inventive concept provides an image denoising method of training a denoise deep learning model without a correct image with respect to an image acquired by a SEM, denoising an image containing noise with the denoise deep learning model, and outputting a denoise image.

The problem to be solved by the technical spirit of the inventive concept is not limited to the above-mentioned problem, and other problems not mentioned will be clearly understood by those skilled in the art from the following description.

According to an aspect of the inventive concept, there is provided an image denoising method including extracting a noise patch from a noisy image, outputting a noise parameter by inputting the noise patch to a noise parameter estimation network (NPE-net), generating imitated virtual noise based on the output noise parameter, generating a noisier image by adding the imitated virtual noise to the noisy image, training a denoise deep learning model by inputting the noisy image and the noisier image as a pair to the denoise deep learning model, inputting the noisy image to the trained denoise deep learning model, and outputting a denoise image obtained by removing noise from the noisy image by the trained denoise deep learning model.

According to an aspect of the inventive concept, there is provided a SEM image denoising method including training a NPE-net with noise data for learning, extracting a noise patch from a non-pattern region included in an SEM image obtained with an SEM for a semiconductor process result, outputting a noise parameter by inputting the noise patch to the NPE-net, generating imitated virtual noise based on the output noise parameter, generating a noisier image by adding the imitated virtual noise to the SEM image, training a denoise deep learning model by inputting the SEM image and the noisier image as a pair to the denoise deep learning model, inputting the SEM image to the trained denoise deep learning model, and outputting a denoise image obtained by removing noise from the SEM image by the trained denoise deep learning model.

According to an aspect of the inventive concept, there is provided a SEM image denoising method including training a NPE-net with a pair composed by taking, as an input, noise data for learning composed of virtual noise data for learning having a random standard deviation of Gaussian distribution noise and taking, as an output, a standard deviation of the Gaussian distribution noise corresponding to the noise data for learning, extracting a noise patch from a non-pattern region included in an SEM image obtained with an SEM for a semiconductor process result, outputting a noise parameter by inputting the noise patch to the NPE-net, generating imitated virtual noise based on the output noise parameter, generating a noisier image by adding the imitated virtual noise to the SEM image, training a denoise deep learning model by inputting the SEM image and the noisier image as a pair to the denoise deep learning model, wherein the denoise deep learning model is trained through an L2 loss function to receive the noisier image and output the SEM image, inputting the SEM image to the trained denoise deep learning model, and outputting a denoise image obtained by removing noise from the SEM image by the trained denoise deep learning model, wherein noise M is calculated by subtracting the SEM image from the noisier image and the denoise image is calculated by subtracting twice the noise M from the noisier image.

BRIEF DESCRIPTION OF THE DRAWINGS

Implementations will be more clearly understood from the following detailed description taken in conjunction with the accompanying drawings in which:

FIG. 7 is a schematic diagram illustrating the calculation of an estimated clean image by a denoising deep learning model in the image denoising method according to some implementations;

DETAILED DESCRIPTION

Figure 1:
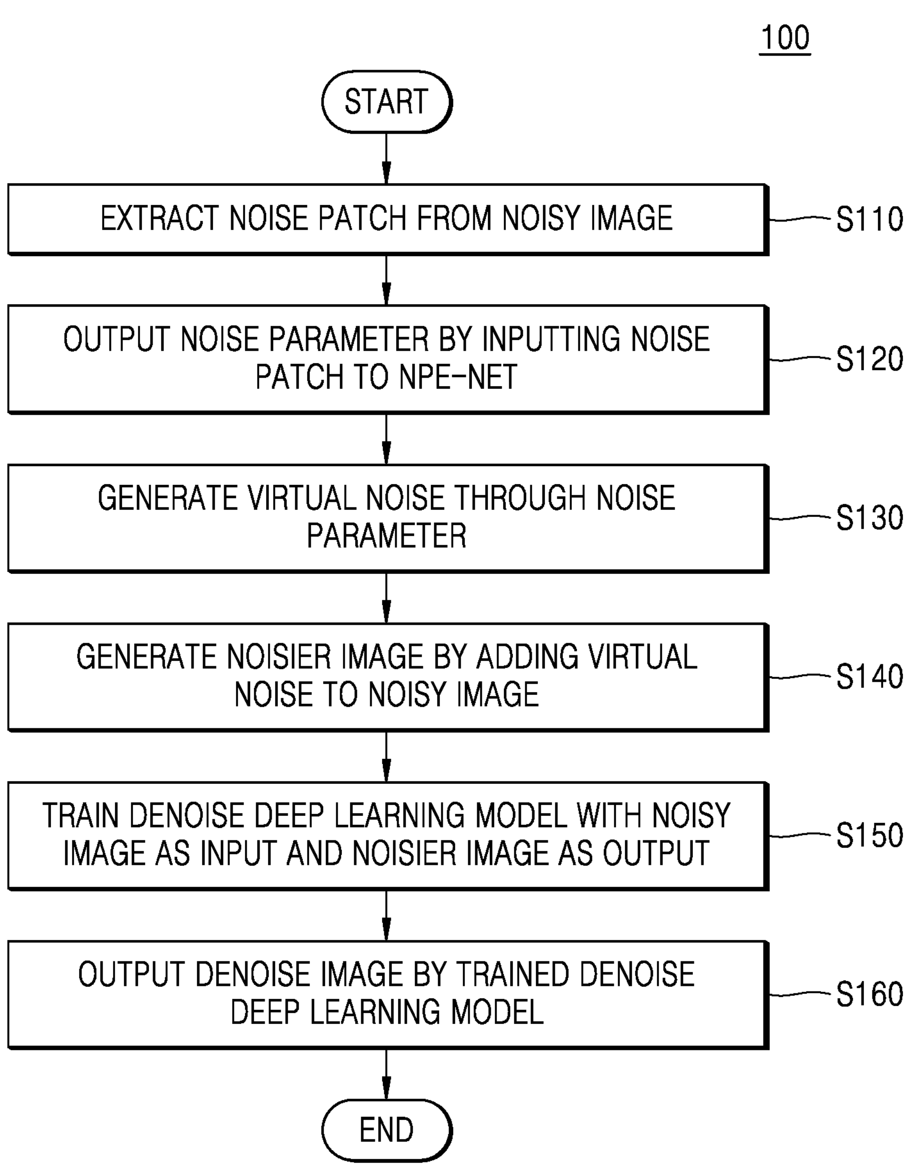
FIG. 1 is a flowchart illustrating an image denoising method according to some implementations.

Hereinafter, implementations of the disclosure will be described in detail with reference to the accompanying drawings. The same reference numerals are used for the same components in the drawings, and duplicate descriptions thereof are omitted.

FIG. 1 is a flowchart illustrating an image denoising method 100 according to some implementations.

Referring to FIG. 1, the image denoising method 100, which is an implementation of the inventive concept, may include extracting a noise patch from a noisy image obtained by photographing (Operation S110), outputting a noise parameter by inputting the noise patch to a trained NPE-net (Operation S120), generating imitated virtual noise calculated based on the output noise parameter (Operation S130), and generating a noisier image by adding the calculated virtual noise to the noisy image (Operation S140). The image denoising method 100 may further include training a denoise deep learning model to denoise the noisier image into the noisy image based on the noisy image and the noisier image (Operation 150), and outputting a denoise image obtained by removing noise from the noisy image by the trained denoise deep learning model (Operation S160). A detailed description of each operation included in the image denoising method 100, which is an implementation of the inventive concept, is given in conjunction with the drawings below.

Figure 2:
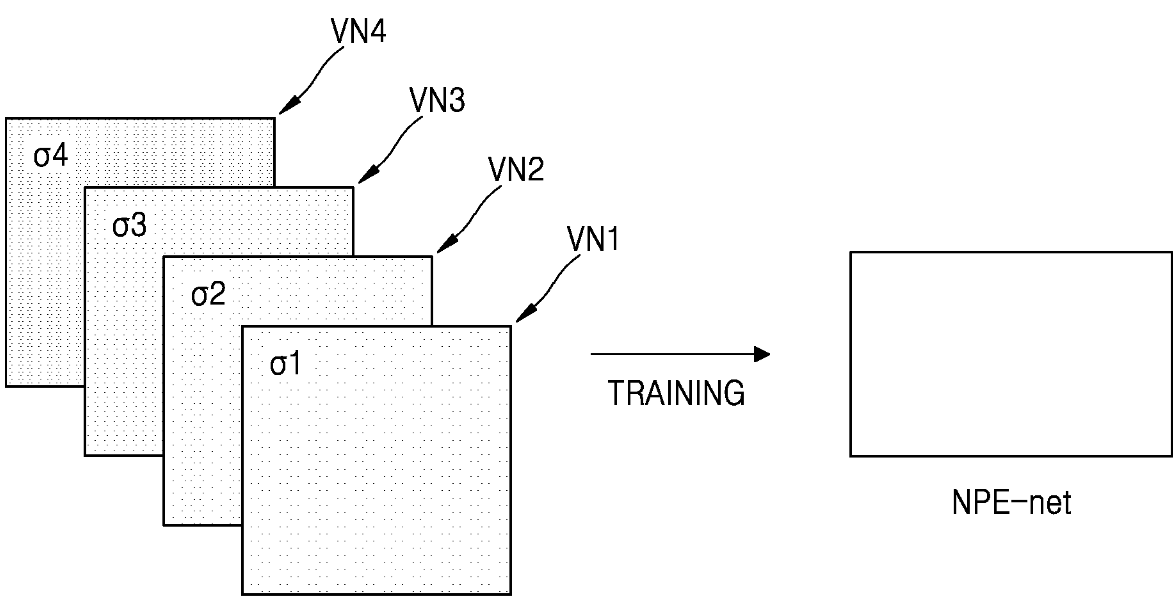
FIG. 2 is a schematic diagram illustrating training of a noise parameter estimation network (NPE)-net in the image denoising method, according to some implementations.

FIG. 2 is a schematic diagram illustrating training of an NPE-net in the image denoising method 100, according to some implementations.

Referring to FIGS. 1 and 2, the NPE-net may be trained using a virtual noisy image having virtual noise as an input and a noise parameter for the virtual noise as an output. In some implementations, the type of noise in the virtual noisy image may correspond to Gaussian noise, and the virtual noise may have mean and standard deviation as Gaussian parameters. As a parameter of Gaussian noise, the mean may be related to brightness of Gaussian noise and as a parameter of Gaussian noise, the standard deviation may be related to intensity of Gaussian noise.

Hereinafter, an example is described by focusing on the standard deviation as a parameter of Gaussian noise, but the inventive concept is not limited thereto.

First virtual noise data VN1 may be Gaussian noise having a first standard deviation $\sigma 1$ as a parameter. Second virtual noise data VN2 may be Gaussian noise having a second standard deviation $\sigma 2$ as a parameter. Third virtual noise data VN3 may be Gaussian noise having a third standard deviation $\sigma 3$ as a parameter. Fourth virtual noise data VN4 may be Gaussian noise having a fourth standard deviation $\sigma 4$ as a parameter.

The first to fourth virtual noise data VN1, VN2, VN3, and VN4 may be images containing only noise. That is, the first to fourth virtual noise data VN1, VN2, VN3, and VN4 may not be images obtained by photographing a certain shape, but may be images containing only noise. In order to distinguish between a noisy image NI to be described below and the first to fourth virtual noise data VN1, VN2, VN3, and VN4, an image containing only noise may be referred to as noise data in this specification.

Four pairs composed by taking the first to fourth virtual noise data VN1, VN2, VN3, and VN4 as inputs and first to fourth standard deviations $\sigma 1$, $\sigma 2$, $\sigma 3$, and $\sigma 4$ respectively corresponding to the first to fourth virtual noise data VN1, VN2, VN3, and VN4 as outputs may be input to the NPE-net to train the NPE-net. That is, the NPE-net is trained to output parameters for input noise data when receiving the input noise data. It is only an example that the NPE-net is trained with four pieces of virtual noise data, and the NPE-net may be trained by receiving one or more pieces of virtual noise data. That is, the inventive concept is not limited by the number of pieces of virtual noise data input to the NPE-net to train the NPE-net.

Figure 3:
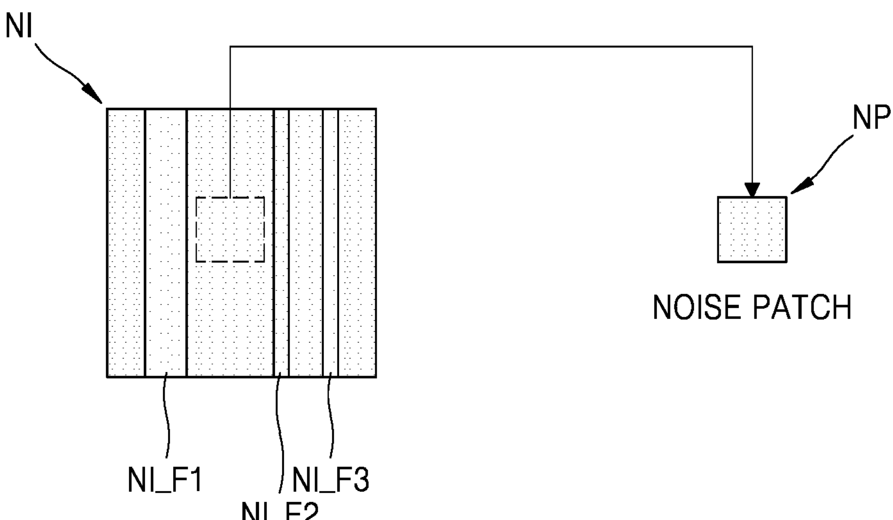
FIG. 3 is a schematic diagram illustrating an image denoising method according to some implementations.

FIG. 3 is a schematic diagram illustrating an image denoising method 100 according to some implementations. The description of FIG. 3 includes a description of an operation (Operation S110) of extracting a noise patch from a noisy image obtained by photographing.

Referring to FIGS. 1 and 3, in the case of an image obtained by photographing a certain object, a boundary according to the outer shape of the object is formed on the image. In some implementations, an image (hereinafter, referred to as an SEM image) obtained by photographing the surface of a semiconductor with a SEM may include noise and a pattern formed on the surface of the semiconductor, as shown in FIG. 3. The SEM image may be referred to herein as a noisy image NI. The noisy image NI may be an image of a semiconductor surface including a pattern. For example, by taking pictures of the surface, on which a first pattern NI_F1, a second pattern NI_F2, and a third pattern NI_F3 are formed, through the SEM, a noisy image including the shapes and boundaries of the first pattern NI_F1, the second pattern NI_F2, and the third pattern NI_F3 may be obtained.

The semiconductor may refer to a semiconductor chip, and a plurality of semiconductor chips may be formed in a wafer. The wafer may be a silicon bulk wafer or an epitaxial wafer. The epitaxial wafer may include a crystalline material layer (i.e., an epitaxial layer) grown on a bulk wafer by an epitaxial process. However, the wafer is not limited to a bulk wafer or an epitaxial wafer. For example, the wafer may include various types of wafers, such as a polished wafer, an annealed wafer, and a silicon on insulator (SOI) wafer.

The wafer may include a plurality of semiconductor chips. The wafer may then be separated into individual semiconductor chips through a singulation process. The semiconductor chips may include the same patterns constituting a semiconductor device. A pattern on a wafer or semiconductor chip may be formed through a series of semiconductor processes, such as a photolithography process and/or an etching process.

SEM images may contain white noise. The white noise is random noise having a constant power spectrum density in all frequency bands. Noise that may be included in the SEM image may be caused by statistical errors in the amount of electrons, fluctuations in the amount of electron light, and irregularities on a sample surface.

White noise refers to random noise uniformly distributed in an image, and may appear randomly in a part of an image or the entire image. White noise may be distinguished from other specific shapes occurring in an image, and noise is not added to image pixel values, but noise values are already reflected in image pixel values at the same time as capturing. Therefore, it may be difficult to remove noise simply by separating pixel values.

In an SEM image, white noise may appear in the form of brightness noise with constant density. Such noise degrades the quality of the SEM image, and it may be difficult to determine the shape and boundary of a semiconductor pattern included in the SEM image.

In some implementations of the inventive concept, noise in the image denoising method 100 may include white noise in the SEM image. The distribution of noise included in the SEM image may appear in various ways, and such a distribution may be approximated by one or more of a plurality of distribution types, such as a Gaussian distribution, a Poisson distribution, a uniform distribution, and an exponential distribution.

In the process of semiconductor processing, countless patterns are provided in the semiconductor process result during the process or at the end of the process. A non-pattern area having a uniform vertical level and in which no pattern is formed may exist between the countless patterns provided in the semiconductor process result. In this specification, a noisy image NI may refer to an SEM image. A noisy image NI may be captured by including the non-pattern area. Noise generated in a non-pattern area included in the noisy image NI is highly likely not to include noise affected by a pattern of a semiconductor process result. That is, the non-pattern area included in the noisy image NI may include a relatively predictable noise distribution compared to noise in a portion including a pattern.

Therefore, in the image denoising method 100 according to some implementations, assuming that the noise formed in the non-pattern area included in the noisy image NI has a certain noise distribution is easier than assuming that the noise formed in the portion including a pattern has a certain noise distribution. A portion of the non-pattern area may be selected as a noise patch NP.

As shown in FIG. 3, a non-pattern area may be included between the first pattern NI_F1 and the second pattern NI_F2. For example, in FIG. 3, a portion of the non-pattern area, which is a rectangular area with a circumference indicated by a dashed line, may be selected as the noise patch NP. Because the noise patch NP does not include a pattern of a semiconductor process result, as described above, the noise included in the noise patch NP may be assumed to have a certain noise distribution.

A plurality of noise patches NP may be selected from the non-pattern area included in the noisy image NI. A plurality of imitated virtual noises (IVNs) may be calculated through the plurality of noise patches NP, and a plurality of noisier images (NRIs) may be calculated by the plurality of IVNs. Accordingly, in the image denoising method 100 according to some implementations, a plurality of denoise images, that is, a plurality of estimated clean images (ECIs), may be calculated through the plurality of noise patches NP. Calculating the plurality of denoise images through the plurality of noise patches NP is the same as performing the image denoise method described in this specification in parallel or individually, and thus a separate description thereof is omitted.

Figure 4:
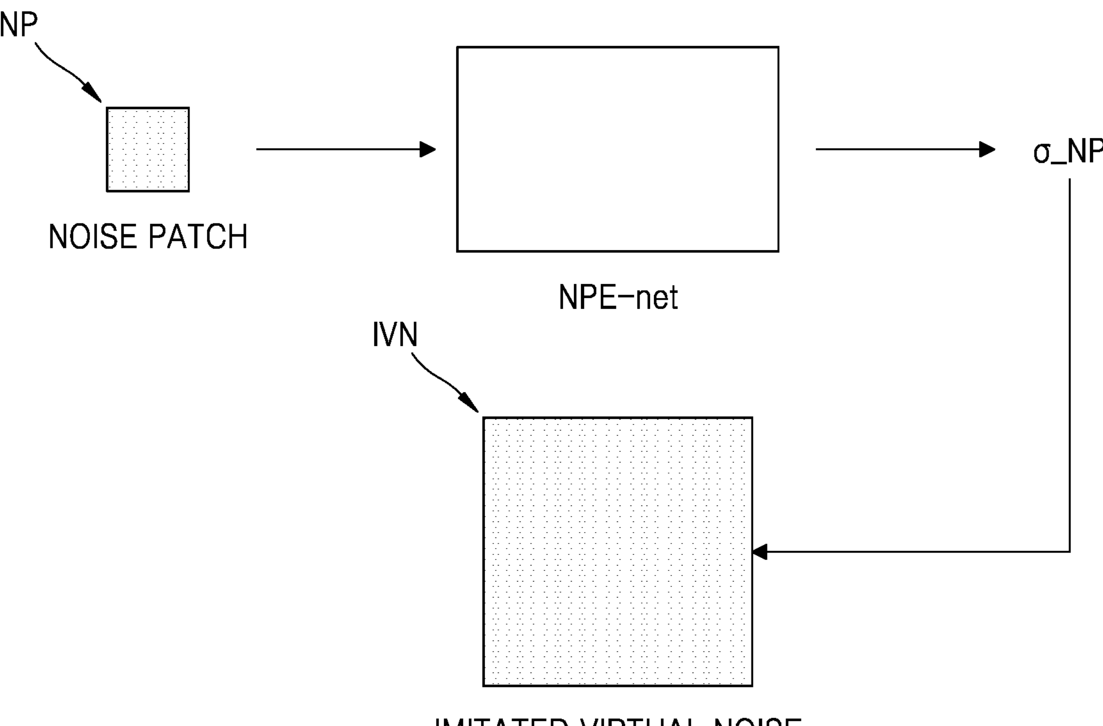
FIG. 4 is a schematic diagram illustrating a process of obtaining calculated virtual noise in the image denoising method according to some implementations.

FIG. 4 is a schematic diagram illustrating a process of obtaining calculated virtual noise in the image denoising method 100 according to some implementations. The description of FIG. 4 includes a description of generating imitated virtual noise calculated based on the output noise parameter (Operation S130).

Referring to FIGS. 1 and 4, the noise patch NP may be input to the NPE-net on which learning has been completed. The NPE-net on which learning has been completed may output parameters according to the noise distribution of the noise patch NP. In some implementations, the NPE-net may perform learning assuming that noise included in images is noise following a Gaussian distribution. Therefore, the NPE-net may analyze an input noise patch NP and output mean and standard deviation, which are parameters of Gaussian distribution. In this specification, it is assumed that the mean, which is a parameter of Gaussian distribution noise, is 0.

The IVN may be calculated based on a standard deviation $\sigma\_NP$ of the noise patch NP output by inputting the noise patch NP to the NPE-net. A parameter value of the IVN may be estimated to have substantially the same value as a parameter value of noise included in the noise patch NP.

Figure 5:
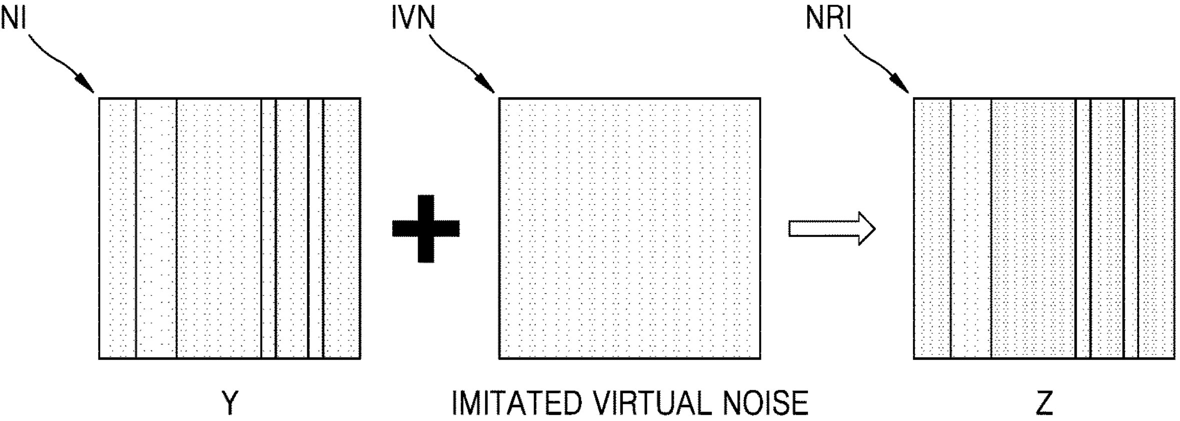
FIG. 5 is a schematic diagram illustrating a process of obtaining a noisier image through calculated virtual noise in the image denoising method according to some implementations.
Figure 6:
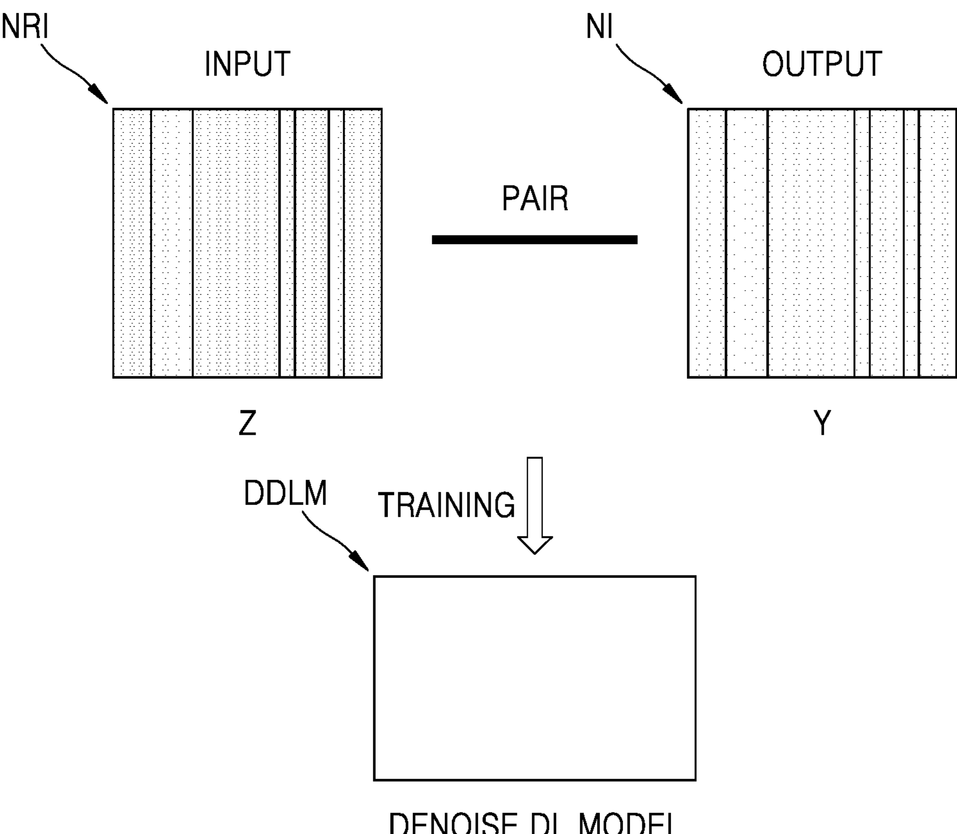
FIG. 6 is a schematic diagram illustrating learning of a denoise deep learning model through a pair of a noisier image and a noisy image in the image denoising method according to some implementations.
Figure 7:
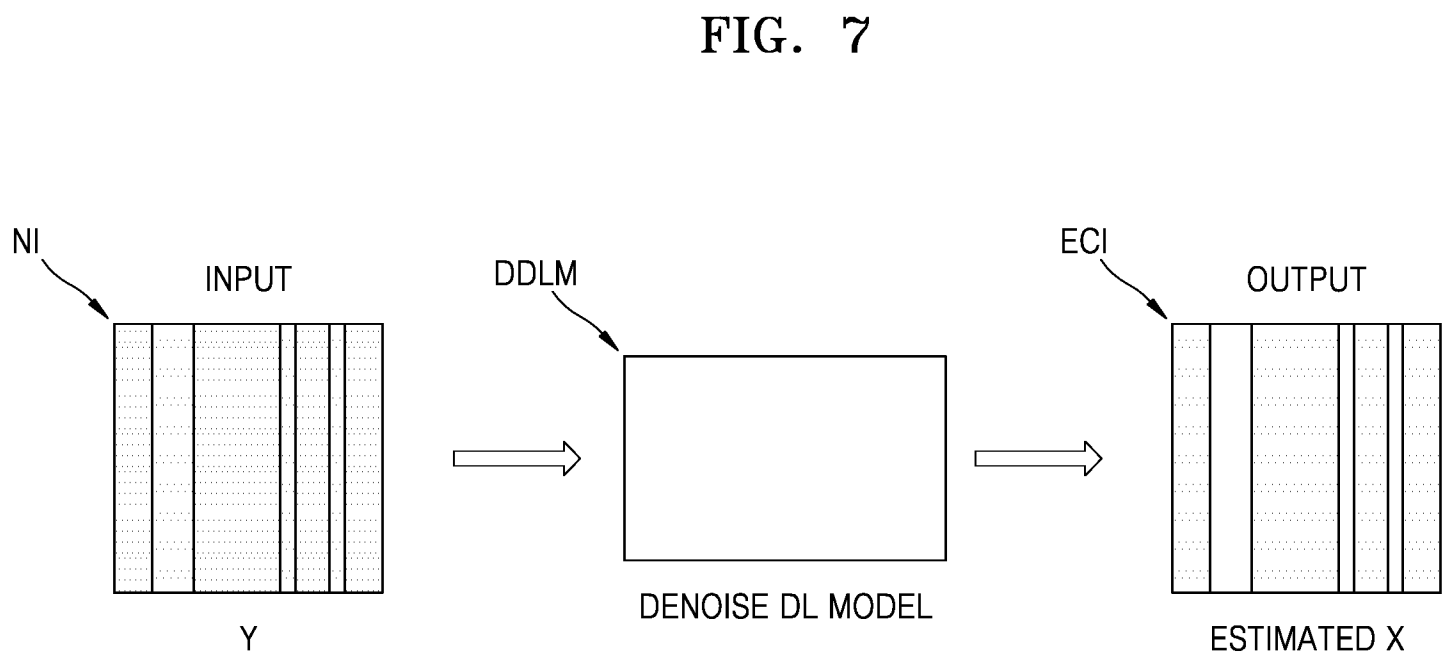
Figure 8:
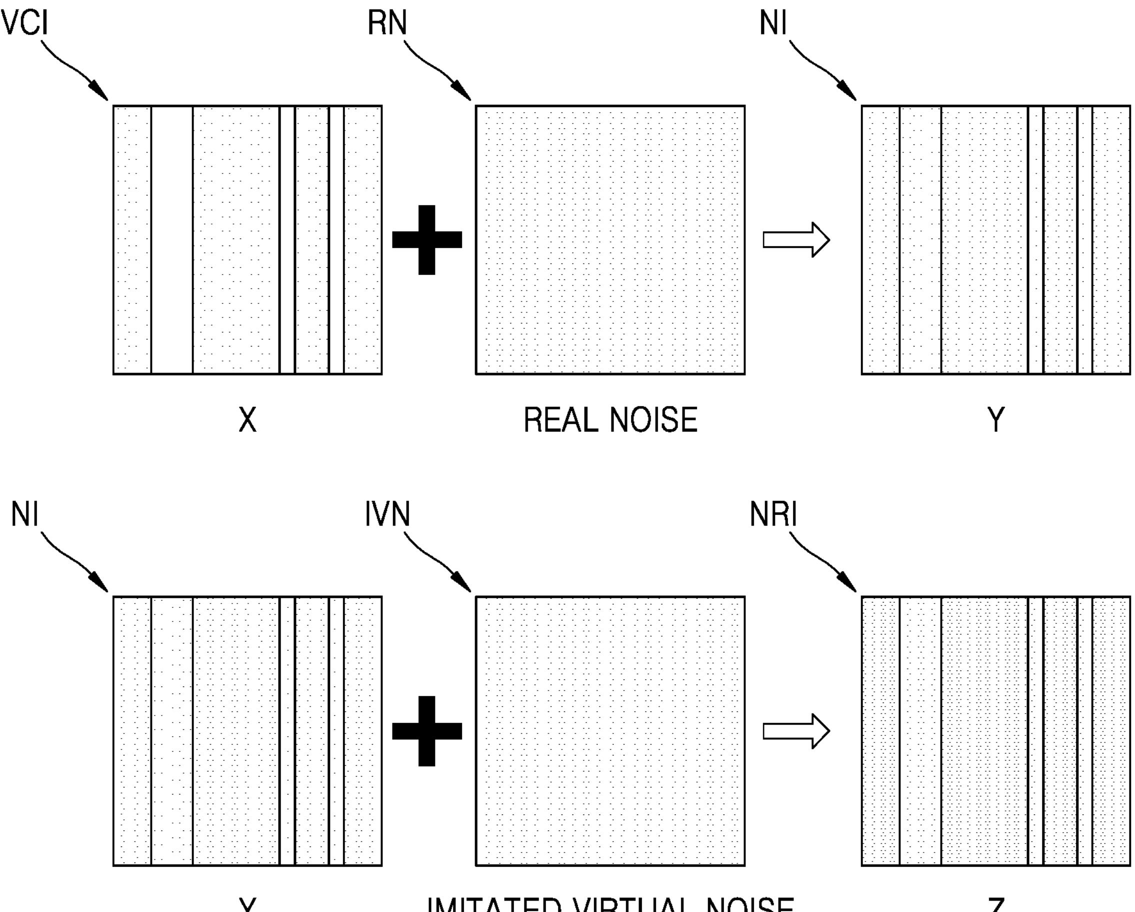
FIG. 8 is a schematic diagram illustrating the relationship between a clean image, a noisy image, and a noisier image in the image denoising method according to some implementations.
Figure 9:
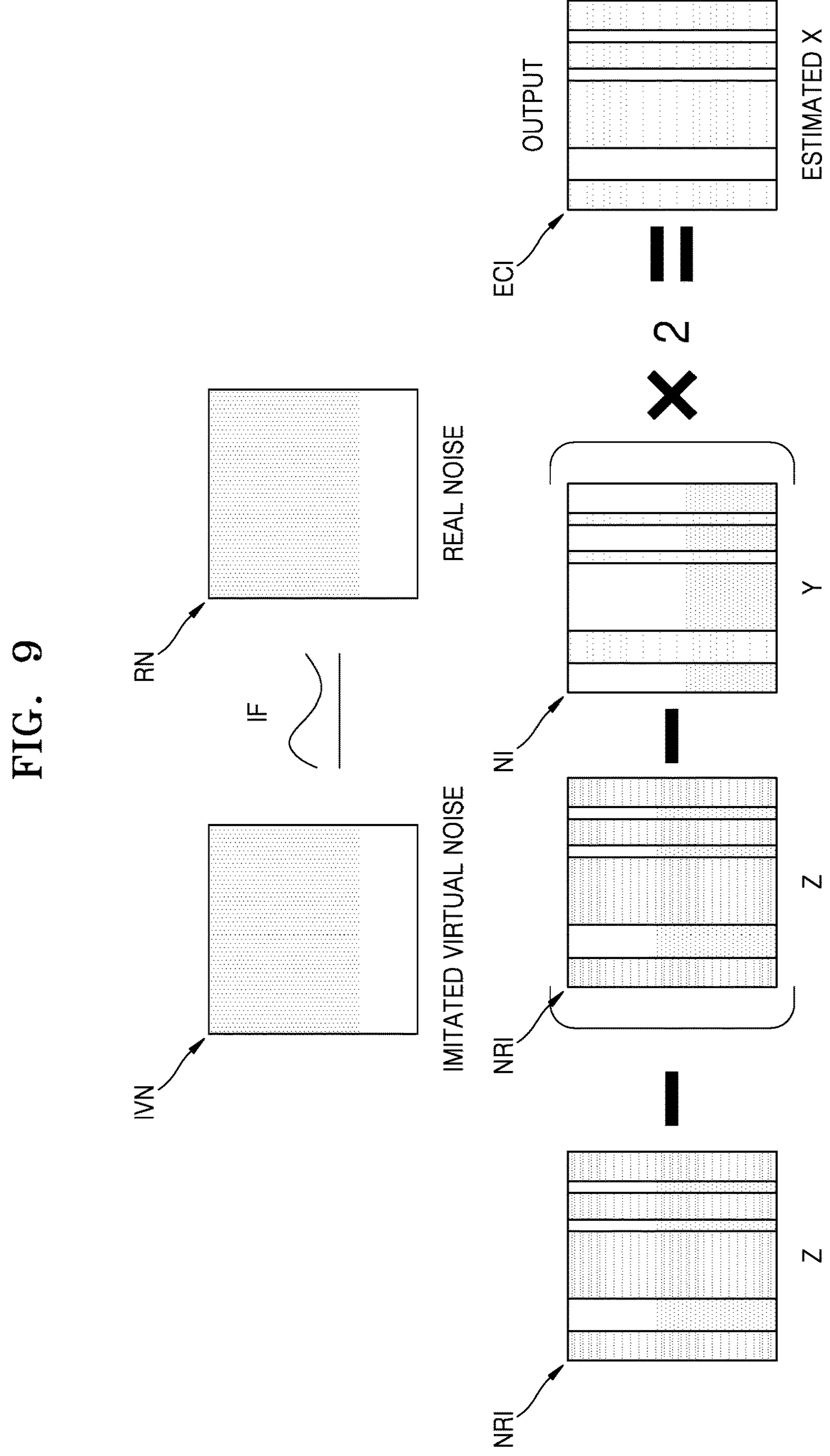
FIG. 9 is a schematic diagram illustrating a process of calculating an estimated clean image based on a clean image, a noisy image, and a noisier image in the image denoising method according to some implementations.
Figure 10:
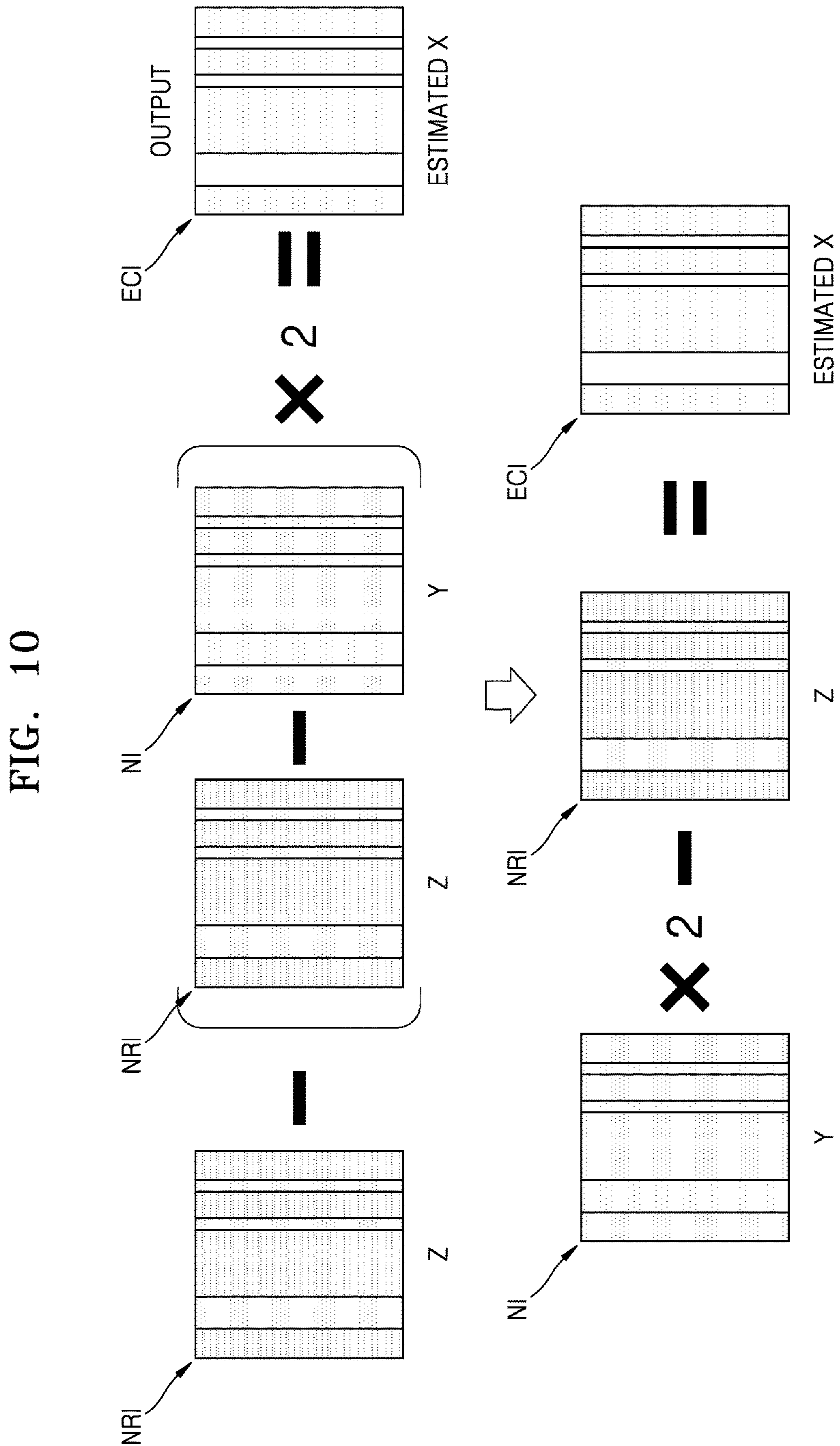
FIG. 10 is a schematic diagram illustrating a process of calculating an estimated clean image based on a clean image, a noisy image, and a noisier image in an image denoising method according to some implementations.

FIG. 5 is a schematic diagram illustrating a process of obtaining a NRI through calculated virtual noise in the image denoising method 100 according to some implementations. FIG. 6 is a schematic diagram illustrating learning of a denoise deep learning model through a pair of a NRI and a noisy image in the image denoising method 100 according to some implementations. FIG. 7 is a schematic diagram illustrating the calculation of an ECI by a denoising deep learning model in the image denoising method 100 according to some implementations. FIG. 8 is a schematic diagram illustrating the relationship between a clean image, a noisy image, and a NRI in the image denoising method 100 according to some implementations. FIG. 9 is a schematic diagram illustrating a process of calculating an ECI based on a clean image, a noisy image, and a NRI in the image denoising method 100 according to some implementations. FIG. 10 is a schematic diagram illustrating a process of calculating an ECI based on a clean image, a noisy image, and a NRI in an image denoising method 100 according to some implementations.

The description of FIG. 5 includes a description of generating a NRI by adding the calculated virtual noise to the noisy image (Operation S140). The description of FIG. 6 includes a description of training a denoise deep learning model to denoise the NRI into the noisy image based on the noisy image and the NRI (Operation 150). The description of FIG. 7 includes descriptions of inputting the noisy image to the trained denoise deep learning model and outputting a denoise image obtained by removing noise from the noisy image by the trained denoise deep learning model (Operation S160).

Referring to FIGS. 1 and 5 to 10, the noisy image NI may be denoted by Y, the NRI may be denoted by Z, and the clean image may be denoted by X. However, the clean image X is a virtual clean image that may not be directly obtained through a photographing device. An ECI may be obtained through the image denoising method 100 according to some implementations, and the ECI may be expressed as E[X|Z]. E[X|Z] means the conditional mean of Z over X. Operation between image and noise data may be performed through operation of each corresponding pixel.

An ideal clean image X in which noise does not exist is a conceptual object, and an ideal clean image X may not be obtained in reality. Therefore, as described below, in the image denoising method 100 according to some implementations, the ECI may be obtained through a noisy image NI, which is an image captured with an SEM that already contains noise, and a NRI obtained by adding IVN to the noisy image NI.

$$Y = X + N \quad \text{[Equation 1]}$$

In Equation 1, Y is a noisy image NI as described above, and refers to an image obtained through SEM equipment. X refers to an ideal clean image. N is a first noise and refers to the difference between X and Y. However, because X is an ideal clean image and may not be actually obtained as described above, the exact value of N may not be known.

$$Z = Y + M = X + N + M \quad \text{[Equation 2]}$$

In Equation 2, Z is the NRI. M is a second noise meaning the difference between Z and Y. Z is a NRI, which is an image obtained by adding an IVN to the noisy image NI. That is, when the IVN is Gaussian distribution noise, Z is an image obtained by adding the IVN, which is Gaussian distribution noise, to Y. That is, Z may be understood as an image with greater noise intensity than Y.

As described above, because the first noise N is a noise that may not be directly separated from the noisy image NI, it may be impossible to accurately calculate the first noise N. However, in the image denoising method 100 according to some implementations, a portion of a non-pattern area existing between semiconductor patterns is selected from an image captured and obtained by the SEM and used as a noise patch NP. Assuming that the noise included in the noise patch NP is a certain distribution noise, by inputting the noise to the NPE-net, the parameters of the certain distribution noise may be output.

In some implementations, it may be assumed that the noise included in the noise patch is Gaussian distribution noise. As described above, because the noise patch is an area in which only noise exists without a semiconductor pattern, the ratio of noise other than white noise is relatively small, and thus, the noise patch may be approximated as containing Gaussian distribution noise. Hereinafter, in this specification, it is assumed that the certain distribution noise is Gaussian distribution noise.

In Equation 2, the second noise M means the IVN calculated through parameters obtained by inputting the noise patch NP, which is a portion of the non-pattern area of Y, to the NPE-net. That is, because the noise patch NP is assumed to be Gaussian distribution noise and the second noise M is output from the noise patch NP through the NPE-net, the second noise M is Gaussian distribution noise. Because the IVN is calculated based on the non-pattern area of Y, which is the noisy image NI, the IVN is noise that imitates the noise of the first noise N included in the non-pattern area. Therefore, it may be assumed that the first noise N and the second noise M have distributions having the same parameters.

$$2E[Y \mid Z] = 2E[X + N \mid Z] = 2E[X \mid Z] + 2E[N \mid Z] \quad \text{[Equation 3]}$$

E[Y|Z] means the conditional expectation of Z given a value of Y. Because Y=X+N and it may be assumed that X and N are linear with each other, Equation 3 may be established.

$$2E[Y \mid Z] = 2(E[X \mid Z] + E[N \mid Z]) = E[X \mid Z] + (E[X \mid Z] + 2E[N \mid Z]) = E[X \mid Z] + (E[X \mid Z] + E[N \mid Z] + E[M \mid Z]) \quad \text{[Equation 4]}$$

Equation 4 is derived using Equation 2 from Equation 3 under the assumption that E[N|Z]=E[M|Z]. As described above, N is the first noise and M is the second noise. Because the second noise M is equal to the IVN generated based on the noise patch NP that is a portion of the first noise N, it may be assumed that the first noise N and the second noise M have the same noise distribution with the same parameters. Therefore, it is possible to assume that E[N|Z]=E[M|Z].

$$E[X \mid Z] + (E[X \mid Z] + E[N \mid Z] + E[M \mid Z]) = E[X \mid Z] + Z \quad \text{[Equation 5]}$$

Equation 5 is derived assuming that the first noise N and the second noise M are each noise independent of the virtual clean image X and that the mean of N and M is 0.

$$2E[Y \mid Z] = E[X \mid Z] + Z \quad \text{[Equation 6]}$$

Equation 6 is an equation derived by combining Equations 5 and 4.

$$E[X \mid Z] = 2E[Y \mid Z] - Z \quad \text{[Equation 7]}$$

Equation 7 is an equation developed from Equation 6. Looking at the result of Equation 7, E[X|Z] on the left side may be calculated from Y and Z through operation on the right side without X.

FIGS. 5 to 10 will be described based on the above description and the contents of Equations 1 to 7.

Referring to FIG. 5, a NRI may be generated by adding IVN to a noisy image NI. That is, this has the same meaning as Z=Y+M in Equation 2 described above. In this case, because the IVN is calculated from the noise patch NP obtained from a portion of the non-pattern area of the noisy image NI, it may be assumed that Y−X corresponding to the first noise and Z−Y corresponding to the second noise have the same distribution.

Referring to FIG. 6, a denoise deep learning model DDLM may be trained by inputting a pair consisting of a NRI and a noisy image NI. The denoise deep learning model DDLM may be trained as an optimization for an appropriate loss function. For example, the loss function may be an L2 loss function.

The L2 loss function is one of the most frequently used loss functions in regression analysis. The mean squared error (MSE) between a given input and a model prediction value is calculated. That is, for all data, the average of the squared difference between a value predicted by the model and an actual value is calculated. It may be determined that, as the calculated value decreases, the prediction is more accurate. The denoise deep learning model DDLM may be trained to minimize the loss function. That is, in the denoise deep learning model DDLM, learning may be performed to minimize the L2 loss function by comparing a predicted output image to the noisy image NI input as a pair therewith.

Referring to FIG. 7, an ECI may be calculated as an output by inputting the noisy image NI to a trained denoise deep learning model DDLM. The ECI may be obtained through Equations 1 to 7 described above. That is, the ECI may be obtained through the operation of 'E[X|Z]=2E[Y|Z]−Z' in Equation 7.

FIGS. 8 to 10 represent the processes of Equations 1 to 7 as images for convenience of understanding. Referring to FIG. 8, it may be understood that Y, which is the noisy image NI, is generated by adding real noise RN (i.e., the first noise N) to a virtual clean image VCI that may not be actually obtained. Similarly, the NRI may be generated by adding an IVN (i.e., the second noise M), which imitates the real noise RN generated from the noise patch NP, to the noisy image YI.

Referring to FIGS. 9 and 10, because the IVN is noise generated by selecting a portion of the non-pattern area of the SEM image, which is a portion of the real noise RN, as a noise patch NP, it may be assumed that the IVN has substantially the same noise distribution as the real noise RN.

That is, because the first noise N and the second noise M have the same noise distribution, subtracting N corresponding to the first noise and M corresponding to the second noise from Z corresponding to the NRI, the ECI may be calculated. In this case, because it is assumed that the first noise N has the same noise distribution as the second noise M, the ECI may be output by subtracting the second noise M twice from Z. These descriptions are schematically shown in FIG. 8.

Referring to FIG. 10, the ECI may be calculated through Equation 7 by deriving the equation described with reference to FIG. 9. A schematic diagram reflecting such a meaning is in FIG. 10.

Through the image denoising method 100 according to some implementations, it is possible to train a denoise deep learning model without a noise-free correct image in denoising an SEM image. Because multiple times of SEM photographing for denoising the SEM image is not required, damage to a pattern of a semiconductor to be photographed may be reduced. In addition, because a portion of the non-pattern area of the noisy image NI, which is an SEM image, is extracted to calculate the IVN, it may be assumed that the noise distribution of the first noise, which is the difference between the noisy image NI and the virtual clean image VCI, is the same as that of the IVN. Therefore, a denoise deep learning model DDLM may be trained without a clean image through a region that does not contain the pattern of an SEM image. In addition, because the process of learning an image denoise model (i.e., the denoise deep learning model DDLM) constituting the image denoising method and the configuration of the image denoise model (i.e., the denoise deep learning model DDLM) may be simplified, required time and computing resources may be reduced.

The ECI denoised by the image denoising method 100 according to some implementations may be used to perform optical proximity correction (OPC). Light passing through an opening of a photomask PM may be diffracted, and as patterns are miniaturized, an optical proximity effect (OPE) due to an effect between neighboring patterns may appear. OPC may be employed to compensate for errors due to the diffraction and OPE, described above. The OPC means generating a mask pattern by calculating the extent to which a resultant product is deformed when projecting a mask pattern onto a wafer and correcting a deformity value.

Because an ECI from which noise is removed is provided during OPC, smoother OPC may be performed, and thus, a semiconductor development process may be improved by the image denoising method 100 according to some implementations.

Figure 11A:
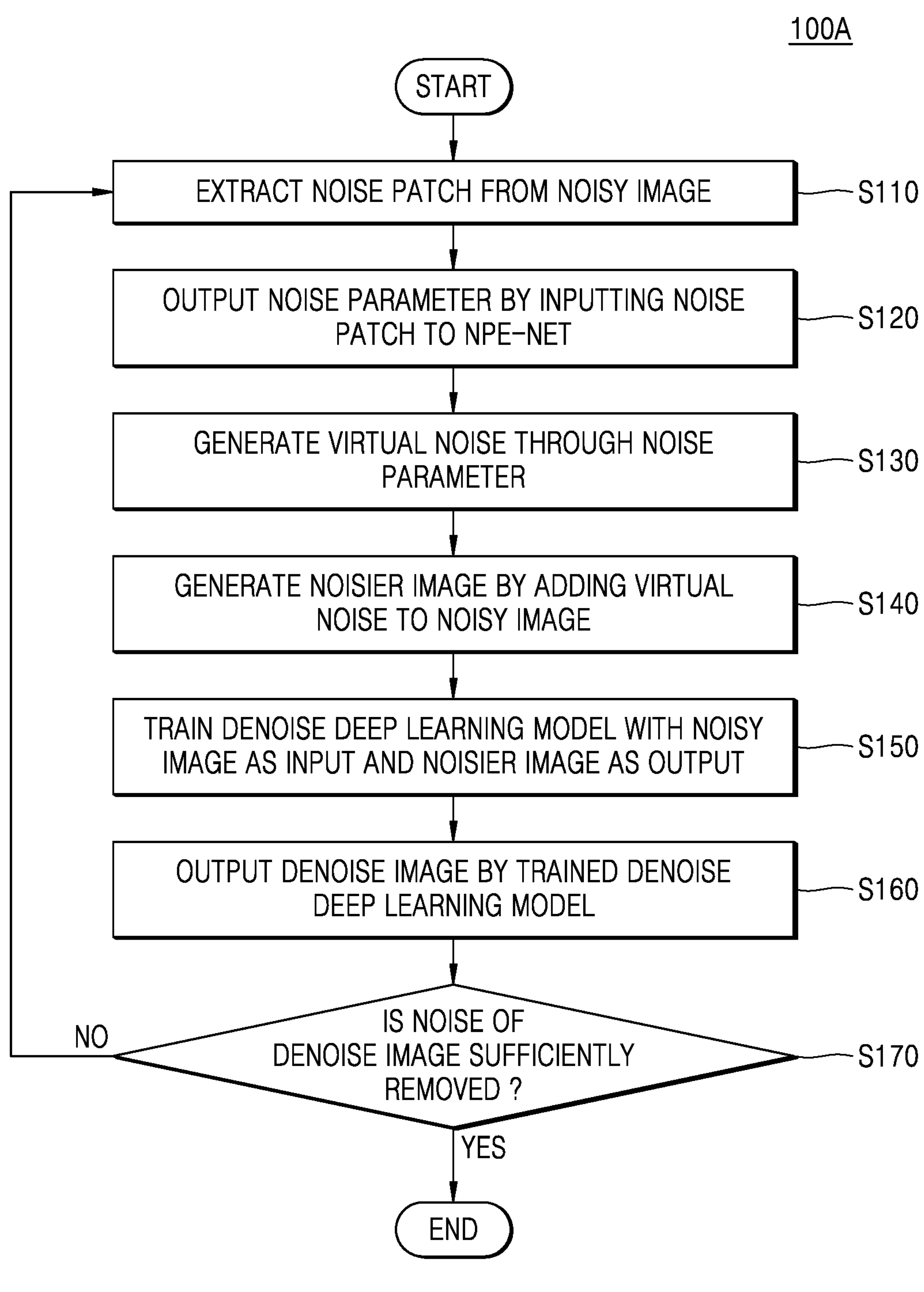
FIG. 11A is a flowchart illustrating an image denoising method according to some implementations.
Figure 11B:
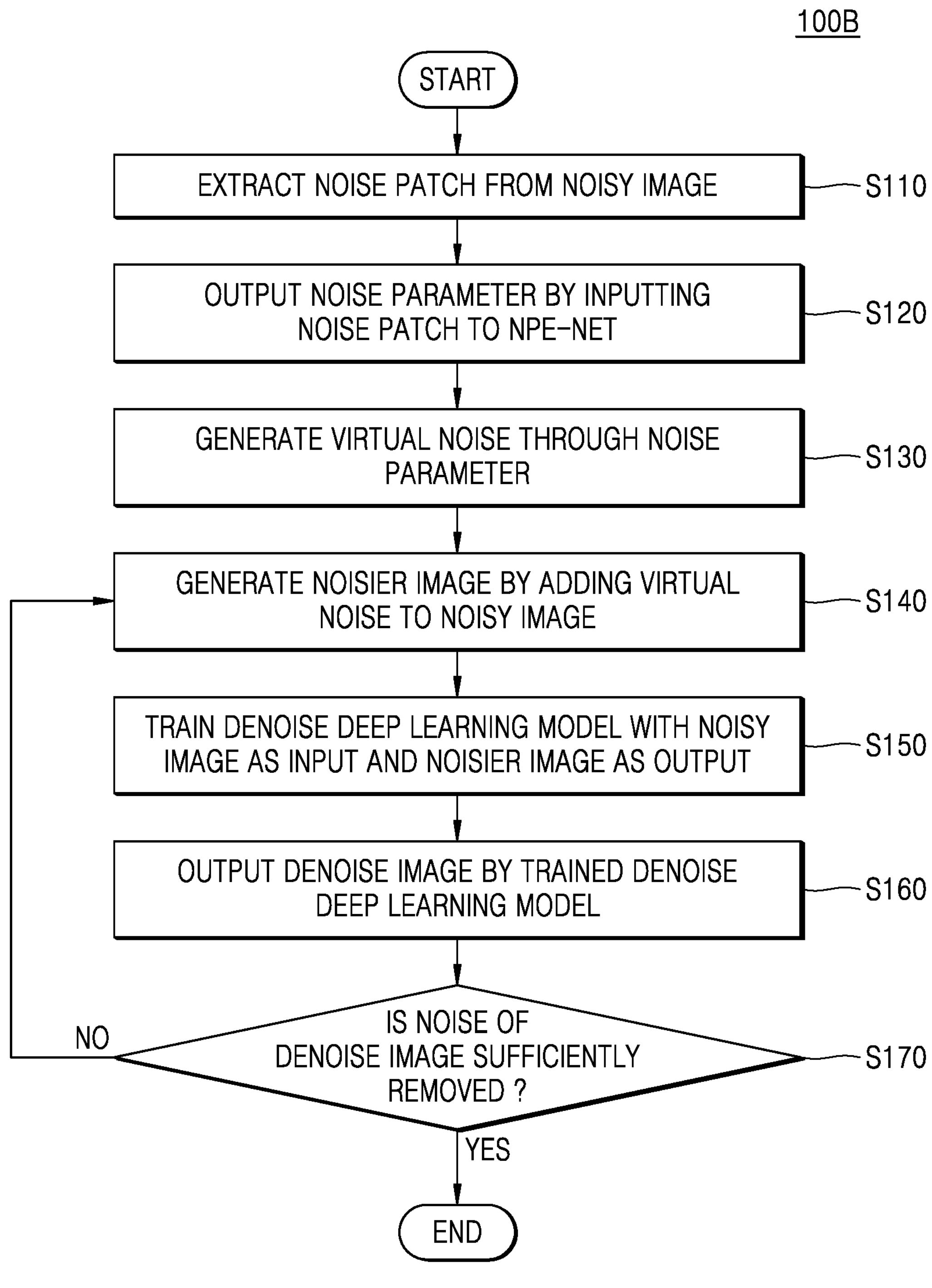
FIG. 11B is a flowchart illustrating an image denoising method according to some implementations.

FIG. 11A is a flowchart illustrating an image denoising method 100A according to some implementations. FIG. 11B is a flowchart illustrating an image denoising method 100B according to some implementations.

Referring to FIG. 11A, the image denoising method 100A may further include determining whether or not the noise of a denoise image, that is, an ECI, is sufficiently removed (Operation S170), in addition to the image denoising method 100 described with reference to FIG. 1.

When it is determined that the noise of the denoise image is sufficiently removed, the image denoising method 100A according to some implementations may end. When it is determined that the noise of the denoise image is not sufficiently removed, the image denoising method 100A according to some implementations may be performed again from the beginning. In this case, residual noise of the ECI initially output may be removed by matching the denoise image to the noisy image and then performing the image denoising method described above.

Referring to FIG. 11B, the image denoising method 100B may further include determining whether or not the noise of a denoise image, that is, an ECI, is sufficiently removed (Operation S170), in addition to the image denoising method 100 described with reference to FIG. 1.

When it is determined that the noise of the denoise image is sufficiently removed, the image denoising method 100B according to some implementations may end. When it is determined that the noise of the denoise image is not sufficiently removed, the image denoising method 100B according to some implementations may be performed again from the beginning. In this case, the generating of a NRI by matching the denoise image to the noisy image (Operation S140) to the determining of whether or not the noise of a denoise image is sufficiently removed (Operation S170) may be performed again.

Figure 12:
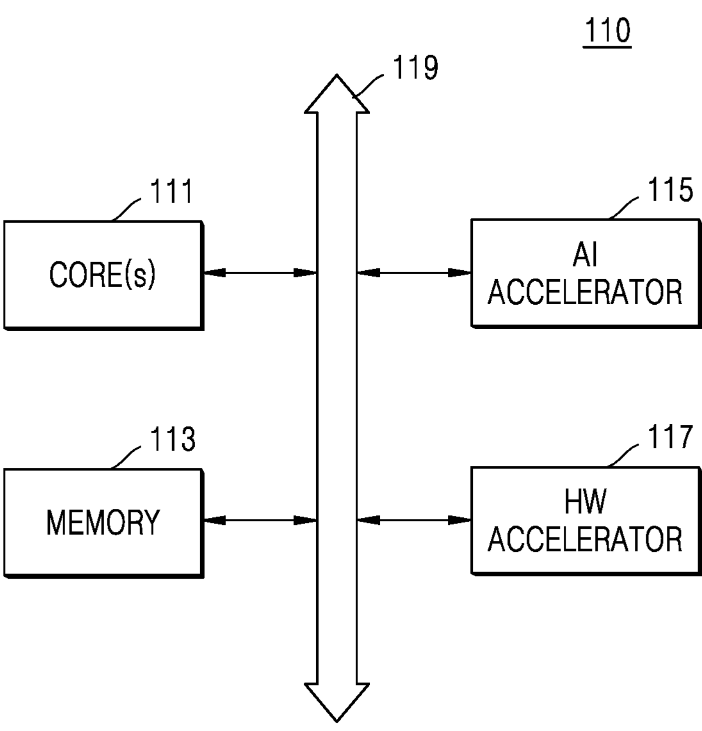
FIG. 12 is a block diagram of an image denoising device according to some implementations.

FIG. 12 is a block diagram of an image denoising device 110 according to some implementations. In some implementations, the image denoising method 100 according to some implementations, described with reference to FIGS. 1 to 11B may be performed by the image denoising device 110 according to some implementations in FIG. 12.

Referring to FIG. 12, the image denoising device 110 may include at least one core 111, a memory 113, an artificial intelligence (AI) accelerator 115, and a hardware accelerator 117. The at least one core 111, the memory 113, the AI accelerator 115, and the hardware accelerator 117 may communicate with each other through a bus 119. In some implementations, the at least one core 111, the memory 113, the AI accelerator 115, and the hardware accelerator 117 may be included in one semiconductor chip. Also, in some implementations, at least two of the at least one core 111, the memory 113, the AI accelerator 115, and the hardware accelerator 117 may be respectively included in two or more semiconductor chips mounted on a wafer (or board).

The at least one core 111 may execute instructions. For example, the at least one core 111 may execute an operating system by executing instructions stored in the memory 113 or may execute applications executed on the operating system. In some implementations, the at least one core 111 may execute instructions to thereby instruct the AI accelerator 115 and/or the hardware accelerator 117 to work and may obtain a result of performing a task from the AI accelerator 115 and/or the hardware accelerator 117. In some implementations, the at least one core 111 may include an application specific instruction set processor (ASIP) customized for a specific purpose and may support a dedicated instruction set.

The memory 113 may have any structure for storing data. For example, the memory 113 may include a volatile memory device, such as dynamic random access memory (DRAM) and static random access memory (SRAM), or may include a non-volatile memory device, such as flash memory and resistive random access memory (ReRAM).

The at least one core 111, the AI accelerator 115, and the hardware accelerator 117 may store data in the memory 113 or read data from the memory 113 through the bus 119.

The AI accelerator 115 may refer to hardware designed for AI applications. In some implementations, the AI accelerator 115 may include a neural processing unit (NPU) for implementing a neuromorphic structure and may generate output data by processing input data provided from the at least one core 111 and/or the hardware accelerator 117 and may provide output data to the at least one core 111 and/or the hardware accelerator 117. In some implementations, the AI accelerator 115 may be programmable and may be programmed by the at least one core 111 and/or the hardware accelerator 117.

The hardware accelerator 117 may refer to hardware designed to perform a certain task at high speed. For example, the hardware accelerator 117 may be designed to perform data conversion, such as demodulation, modulation, encoding, and decoding, at a high speed. The hardware accelerator 117 may be programmable and may be programmed by the at least one core 111 and/or the hardware accelerator 117.

The image denoising device 110 may perform an image denoising method according to some implementations of the disclosure and may be referred to as a device for performing the image denoising method. For example, the AI accelerator 115 may perform the roles of a DDLM.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

While the inventive concept has been particularly shown and described with reference to implementations thereof, it will be understood that various changes in form and details may be made therein without departing from the spirit and scope of the following claims.

What is claimed is:

1. An image denoising method comprising:

extracting a noise patch from a noisy image;

outputting a noise parameter by inputting the noise patch to a noise parameter estimation network (NPE-net);

generating imitated virtual noise based on the output noise parameter;

generating a noisier image by adding the imitated virtual noise to the noisy image;

training a denoise deep learning model by inputting the noisy image and the noisier image as a pair to the denoise deep learning model;

inputting the noisy image to the trained denoise deep learning model; and outputting a denoise image obtained by removing noise from the noisy image by the trained denoise deep learning model.

2. The image denoising method of claim 1, wherein the noisy image comprises a scanning electron microscope (SEM) image obtained with an SEM for a semiconductor process result.

3. The image denoising method of claim 2, wherein the noise patch targets only a noise portion that does not include a pattern shape of the semiconductor process result in the semiconductor process result.

4. The image denoising method of claim 1, wherein a pair composed by taking a plurality of pieces of learning noise data as inputs and noise parameters of the plurality of pieces of learning noise data as outputs is input to the NPE-net to train the NPE-net.

5. The image denoising method of claim 4, wherein each of the plurality of pieces of learning noise data includes virtual learning noise data having a random noise parameter.

6. The image denoising method of claim 1, wherein the NPE-net assumes that noise included in the noise patch is Gaussian noise following a Gaussian distribution, and the noise parameter includes a noise average and a noise standard deviation.

7. The image denoising method of claim 1, wherein the denoise deep learning model is trained to receive the noisier image and output the noisy image.

8. The image denoising method of claim 1, wherein the outputting of the denoise image includes calculating noise M obtained by subtracting the noisy image from the noisier image input to the trained denoise deep learning model, and calculating the denoise image by subtracting twice the noise M from the noisier image.

9. The image denoising method of claim 1, wherein the denoise deep learning model is learned through an L2 loss function.

10. The image denoising method of claim 1, further comprising, after the outputting of the denoise image, inputting the denoise image into an optical proximity correction (OPC) model.

11. The image denoising method of claim 1, further comprising:

after the outputting of the denoise image, determining whether noise included in the denoise image is sufficiently remove;

subsequent to determining that the noise included in the denoise image is sufficiently removed, terminating the image denoising method; and subsequent to determining that the noise included in the denoise image is not sufficiently removed, performing the extracting of the noise patch to the outputting of the denoise image again by using the denoise image as the noisy image.

12. The image denoising method of claim 1, further comprising:

after the outputting of the denoise image, determining whether noise included in the denoise image is sufficiently removed;

subsequent to determining that the noise included in the denoise image is sufficiently removed, terminating the image denoising method; and subsequent to determining that the noise included in the denoise image is not sufficiently removed, performing the generating of the noisier image to the outputting of the denoise image again by using the denoise image as the noisy image.

13. A scanning electron microscope (SEM) image denoising method comprising:

training a noise parameter estimation network (NPE-net) with noise data for learning;

extracting a noise patch from a non-pattern region included in an SEM image obtained with an SEM for a semiconductor process result;

outputting a noise parameter by inputting the noise patch to the NPE-net;

generating imitated virtual noise based on the output noise parameter;

generating a noisier image by adding the imitated virtual noise to the SEM image;

training a denoise deep learning model by inputting the SEM image and the noisier image as a pair to the denoise deep learning model;

inputting the SEM image to the trained denoise deep learning model; and outputting a denoise image obtained by removing noise from the SEM image by the trained denoise deep learning model.

14. The SEM image denoising method of claim 13, wherein the NPE-net is trained with a pair composed by taking, as an input, the noise data for learning composed of virtual noise data for learning having a random standard deviation of Gaussian distribution noise and taking, as an output, a standard deviation of the Gaussian distribution noise corresponding to the noise data for learning.

15. The SEM image denoising method of claim 14, wherein the outputting of the denoise image includes calculating noise M obtained by subtracting the SEM image from the noisier image input to the trained denoise deep learning model, and outputting the denoise image by subtracting twice the noise M from the noisier image, wherein the noise M is Gaussian distribution noise.

16. The SEM image denoising method of claim 15, wherein a Gaussian distribution average of the noise M is 0.

17. The SEM image denoising method of claim 13, wherein the noise patch includes a plurality of noise patches extracted from the non-pattern region, and subsequent operations are performed in parallel or individually by using the plurality of the noise patches to output a plurality of denoise images.

18. The SEM image denoising method of claim 13, further comprising:

after the outputting of the denoise image, determining whether noise included in the denoise image is sufficiently removed;

subsequent to determining that the noise included in the denoise image is sufficiently removed, terminating the SEM image denoising method; and subsequent to determining that noise included in the denoise image is not sufficiently removed, performing the extracting of the noise patch to the outputting of the denoise again by using the denoise image as the SEM image.

19. A scanning electron microscope (SEM) image denoising method comprising:

training a noise parameter estimation network (NPE-net) with a pair composed by taking, as an input, noise data for learning composed of virtual noise data for learning having a random standard deviation of Gaussian distribution noise and taking, as an output, a standard deviation of the Gaussian distribution noise corresponding to the noise data for learning;

extracting a noise patch from a non-pattern region included in an SEM image obtained with an SEM for a semiconductor process result;

outputting a noise parameter by inputting the noise patch to the NPE-net;

generating imitated virtual noise based on the output noise parameter;

generating a noisier image by adding the imitated virtual noise to the SEM image;

training a denoise deep learning model by inputting the SEM image and the noisier image as a pair to the denoise deep learning model, wherein the denoise deep learning model is trained through an L2 loss function to receive the noisier image and output the SEM image;

inputting the SEM image to the trained denoise deep learning model; and outputting a denoise image obtained by removing noise from the SEM image by the trained denoise deep learning model, wherein noise M is calculated by subtracting the SEM image from the noisier image and the denoise image is calculated by subtracting twice the noise M from the noisier image.

20. The SEM image denoising method of claim 19, further comprising:

after the outputting of the denoise image, determining whether noise included in the denoise image is sufficiently removed;

subsequent to determining that the noise included in the denoise image is sufficiently removed, terminating the SEM image denoising method; and subsequent to determining that the noise included in the denoise image is not sufficiently removed, performing the extracting of the noise patch to the outputting of the denoise image again by using the denoise image as the SEM image, wherein the noise patch includes a plurality of noise patches extracted from the non-pattern region, and subsequent operations are performed in parallel or individually by using the plurality of the noise patches to output a plurality of denoise images.

* * * * *